United States Patent [19]

Gormley et al.

[11] 4,090,986

[45] May 23, 1978

[54] THERMOSET EPOXY FOAM COMPOSITIONS AND A METHOD OF PREPARING THE SAME

[75] Inventors: William T. Gormley, Pittsburgh, Pa.; Gerald J. Gillespie, Westfield, N.J.

[73] Assignee: Koppers Company, Inc., Pittsburgh, Pa.

[21] Appl. No.: 593,838

[22] Filed: Jul. 7, 1975

[51] Int. Cl.$^2$ .................... C08J 9/08; C08G 59/42
[52] U.S. Cl. .................. 260/2.5 EP; 260/2 EA; 260/2.5 B; 260/47 EA; 260/837 R
[58] Field of Search .................... 260/2.5 EP, 346.3

[56] References Cited

U.S. PATENT DOCUMENTS

| | | | |
|---|---|---|---|
| 2,739,134 | 3/1956 | Parry et al. | 260/2.5 EP |
| 3,223,654 | 12/1965 | Nickerson et al. | 260/2.5 EP |
| 3,325,341 | 6/1967 | Shannon | 260/2.5 EP |
| 3,341,555 | 9/1967 | Wooster et al. | 260/346.3 |
| 3,620,990 | 11/1971 | Hazen et al. | 260/2.5 EP |

*Primary Examiner*—John C. Bleutge
*Attorney, Agent, or Firm*—Kenneth J. Stachel; Herbert J. Zeh, Jr.; Oscar B. Brumback

[57] ABSTRACT

Thermoset epoxy foams are produced from an epoxy resin, delta-1-tetrahydrophthalic anhydride, and an amine accelerator. These compounds are mixed in resin-foaming amounts to produce a foamable mixture to which typical foam additives like auxiliary blowing agents, surfactants, microscopic spheres, etc., may also be added. This foamable mixture is heated at a temperature of at least 115° C. to foam and cure the mixture to produce thermoset epoxy foams.

17 Claims, No Drawings

THERMOSET EPOXY FOAM COMPOSITIONS AND A METHOD OF PREPARING THE SAME

BACKGROUND OF THE INVENTION

This invention relates to thermoset epoxy foam composition of delta-1-tetrahydrophthalic anhydride and epoxy resin and a method of preparing them.

The use of acid anhydrides as curing agents for epoxy resin is known in the art. Examples of acid anhydrides that have been used are maleic, citraconic, itaconic, pyromellitic, dodecylsuccinic, phthalic and hydrogenated phthalic anhydrides like tetra and hexahydrophthalic anhydrides. Of the hydrogenated phthalic anhydrides, the tetrahydrophthalic anhydride (THPA) is less preferred than the lower melting hexahydrophthalic anhydride (HHPA).

The THPA is used in admixture with HHPA in a ratio of 13 parts of THPA with 78 parts of HHPA of 25 parts of THPA with 50 parts of HHPA and 25 parts of phthalic anhydride. also, THPA is used as a liquid mixture of THPA isomers, delta-1-THPA, delta-2-THPA, delta-3-THPA and delta-4-THPA. These THPA isomers differ in the position of the double bond in the closed ring portion of the molecule. Independently, each isomer is a solid at room temperature but when the isomers are mixed together the resulting mixture is a liquid at room temperature. These isomers are also referred to as cyclohexene-1,2-dicarboxylic anhydride isomers with the prefix 1, 2, 3 or 4 to indicate the position of the double bond. The most readily available isomer is the delta-4-THPA or 4-cyclohexene-1,2-dicarboxylic anhydride.

When THPA is used as a curing agent for an epoxy resin in the above described manner to produce a foamed epoxy product, a blowing agent must be introduced into the THPA and epxoy resin mixture. The blowing agent liberates a gas or vapor at the curing temperature of the THPA and epoxy resin mixture before gelation occurs. Typical blowing agents are high boiling gases, such as Freon gases; or low boiling liquids, which vaporize at the curing temperature to release a gas. Examples of the decomposition type blowing agents are Celogen [p,p'-oxybis-(benzenesulfonylhydrazide)] an Unicel ND (dinitrosopentamethylenetetramine).

Some curing agents react in such a manner as to liberate the gas by themselves, while other curing agents may be reacted with certain compounds to produce the gas for foaming. "Handbook of Epoxy Resins" by Lee and Neville, McGraw-Hill Book Company, New York, 1967, provides examples of these types of curing agents. Examples of the former type are the amine boranes, aconitic acid and substituted phosphitoborohydrides. Examples of the latter are the addition of N,N'-dinitroso-N,N'-dimethyl terephthalamide to fatty-polyamide curing agents to liberate nitrogen or the addition of hydrogen peroxide to primary amine curing agents. Another example of the former type of curing agent according to U.S. Pat. No. 3,320,187, Samuel L. Burt, is amine carbamate salts which decompose to produce carbon dioxide. An article by Michelotte, Knuth, and Bauley, J. Chem. Eng. Data 4, 79, 1959 gives other examples of the above described latter type of curing agent. They disclose that curing agents, citraconic, itaconic, and chlorocitraconic anhydrides release carbon dioxide when reacted with benzyldimethylamine, a tertiary amine. They suspect that the carbon dioxide is released by the decarboxylation of the named anhydrides. The named anhydrides in the presence of base lose an allylic hydrogen and undergo a self-condensation of unknown nature, eliminating carbon dioxide in the process. A foamed epoxy produced in this manner with these curing agents has a dark color.

Some of the curing discussed above are also used to produce syntactic foams. Epoxy foams of the syntactic type, syntactic foams, are produced by adding low-density fillers into the formulations of epoxy resin and curing agent. Foams of this type involve the utilization of microscopically small hollow spheres made of phenolic resin, clay, urea formaldehyde, glass, or polystyrene. These spheres contain gas or liquid that cause the spheres to expand or balloon when heated or that act as blowing agents when the spheres are broken by vibration.

Epoxy foams have cells which have either an open cell structure or a closed cell structure or various amounts of open cells and closed cells. The closed cell structures have low thermal conductivity and low water absorption, whereas open cell structures have better acoustic insulation properties and cushioning characteristics. The general principle is that flexible materials tend to have open cell structures while rigid materials tend to have closed cell structures, but there are exceptions. The type of cell structure is largely determined by the method of expansion. The epoxy foams made by thermal decomposition of chemical blowing agents are usually foams with a high percentate of closed cells. Epoxy foams prepared by the "in-situ" chemical reactions can be either the open cell or closed cell type. Another foaming parameter is cell size, which is approximately 0.1-5 mm for foams below 0.10 pcf (pounds per cubic foot) and 0.5-5 mm for foams greater than 10 pcf. Cell shape is dependent on foaming techniques; such as, open mold or floating platen.

Illustrative of the prior art pertinent to the production of epoxy foams are the following U.S. Pat. Nos.: 3,282,863 (Carey et al.); 3,310,507 (Shepherd); 3,630,990 (Hazen et al.) and 3,341,555 (Wooster et al.).

It is the object of this invention to prepare thermoset epoxy foam compositions which are either epoxy chemical foams or epoxy syntactic foams by using delta-1-tetrahydrophthalic anhydride as both a curing agent and a foaming agent.

SUMMARY OF THE INVENTION

In accordance with this invention a method is provided for making thermoset epoxy foams from a foamable mixture of delta-1-tetrahydrophthalic anhydride, epoxy resin, and a tertiary or secondary amine accelerator or from formulations containing this foamable mixture and typical epoxy foam additives. The process, products, foamable mixture and formulations of this invention are based on the discovery that delta-1-tetrahydrophthalic anhydride (delta-1-THPA) can act as a curing agent and a blowing agent in the production of thermoset epoxy foams. The process of the present invention comprises mixing in resinfoaming amounts the delta-1-THPA, an epoxy resin, and a tertiary or secondary amine accelerator then heating this mixture to a curing temperature of at least 115° C.

The mixing procedure varies with the type of epoxy resin used and whether typical epoxy foam additives are used in the foamable mixture of delta-1-THPA, epoxy resin, and tertiary or secondary amine. It is preferred to preheat the epoxy resin before it is mixed with the delta- 1-THPA and tertiary or secondary amine. This preheating decreases the viscosity of the epoxy resin and expedites the mixing of the epoxy resin with the delta-1-THPA and tertiary or secondary amine.

The temperature of curing is generally at least 115° C. where the initial curing reaction occurs. This temperature of curing may vary depending on the particular epoxy resin, and tertiary or secondary amine used in the foamable mixture.

The epoxy resin used may be a solid or a liquid. If a solid epoxy is used, then the foamable mixture of epoxy resin, delta-1-THPA and tertiary or secondary amine is a powdered foamable mixture. Suitable epoxy resins are those prepared by reacting a dihydric phenol such as 2,2-bis-(4-hydroxyphenyl) propane, generally referred to as Bisphenol A, with epichlorohydrin. An example of such resins are those of the formula:

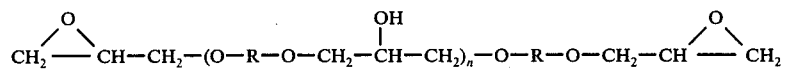

wherein 'n' has a value of 0.3 to 20 and 'R' represents hydrocarbon radical of the dihydric phenol such as Bisphenol A. These resins are readily available commercially as Epon 826, 828, 830, 1001, 1002, 1004, 1007, 1009 and ERL 2772, 2774 and 3794. The former (resins) are manufactured by Shell Chemical Co. and the latter (resins) are manufactured by Bakelite Co. of the Union Carbide Plastic Division.

The phrase "resin-foaming amounts" refers to the amount of any anhydride curing agent, epoxy resin and amine accelerator usually used in the art to produce a foamed epoxy product. Generally, the amount of delta-1-THPA and epoxy resin used to produce a foamed epoxy product are stoichiometric amounts of a 1:1 ratio. The greater the amount of hydroxyl groups present in the epoxy resin the further the ratio is from unity and the closer the ratio of delta-1-THPA to epoxy resin is to the lower value in a range of 0.5—1.0 chemical equivalents. The delta-1-THPA need not be absolutely pure. The delta-1-THPA may contain a small amount of delta-1-tetrahydrophthalic acid.

Typical epoxy foam additives may be added to the foamable mixture of delta-1-THPA epoxy resin and tertiary or secondary amine. These additives include auxiliary blowing agents to increase the amount of foaming of the foamable mixture. Surfactants may also be added to control the cell size and to provide a fine and uniform dispersion of the gas bubble in the foamable mixture. Also, microscopically small hollow spheres may be added to produce an epoxy foam referred to as a syntactic foam. These spheres would increase the foaming of the mixture by expanding when heated. If these additives are added to the foamable mixture of delta-1-THPA, epoxy resin and tertiary or secondary amine, they must be added before the mixture is heated to the curing temperature.

DESCRIPTION OF THE INVENTION

The delta-1-THPA employed in the process of this invention may be produced by any method known to those skilled in the art. The cis-delta-4-tetrahydrophthalic anhydride, which is available commercially, may be isomerized to produce delta-1-THPA. Also, ethyl-2-cyano-1-cyclohexenecarboxylate, which is obtained from ethyl-2-cyclohexanonecarboxylate by the cyanohydrin reaction, may undergo acid hydrolysis to produce delta-1-THPA. This method is discussed by Bailey and Amstutz in Jl. of Am. Chem. Soc. 78, 3828 (1956). The delta-1-THPA need not be absolutely pure. It may contain a minor amount of delta-1-tetrahydrophthalic acid. This small amount of acid may act as a hydrogen donor for the secondary amine to stimulate the reaction of the secondary amine with epoxy resin to form a tertiary amine. This tertiary amine may then react as the amine accelerator in an admixture with epoxy resin and delta-1-THPA, if the tertiary amine is not sterically hindered. The preferred amount of delta-1-THPA used is in the range of 40 to 82 PHR (parts per hundred parts of resin) or in the range of 0.5 to 1.0 chemical equivalents. The unit, PHR, is the common unit of measure in epoxy technology.

The epoxy resins to be used in preparing the foamed mixture and formulations of the present invention comprise those materials possessing more than one epoxy group, i.e., more than one

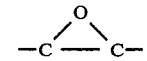

group per molecule. The epoxy resins or polymeric polyepoxides are either solid or liquid glycidyl ethers. The glycidyl ethers preferred are those of polyhydric phenols or polyhydric alcohols. The glycidyl ethers particularly preferred are diglycidyl ethers of bisphenol A. Examples of these are: the solid, Epon 1001, Epon 1002, Epon 1004, Epon 1007 and Epon 1009; and the liquid, Epon 826, Epon 828 and Epon 830, manufactured by Shell Chemical Corp. Also, the following epoxy resins may be used: the solid ERL-2002, 2003 and 3001 and the liquid ERL 2772, 2774 and 3794 manufactured by Bakelite Co. of the Union Carbide Plastics Division. Any epoxy resin that is comparable to the above listed epoxy resins may be used regardless of the manufacturer. It is preferred to use the liquid diglycidyl ethers of bisphenol A. The amount of epoxy resin used in the process of this invention is defined as 100 parts according to the definition of the unit, PHR.

Tertiary or secondary amines are utilized in process of this invention to act as accelerators for the curing reaction of epoxy resin and delta-1-THPA. When the secondary amines are used, a hydrogen donor compound should be present to stimulate the reaction between the secondary amine and the epoxy resin to produce a tertiary amine. This tertiary amine then acts as the accelerator, just as any other tertiary amine. The hydrogen donor compound may be a small amount of delta-1-tetrahydrophthalic acid in the delta-1-THPA as previously discussed or the hydroxyl groups in the epoxy resin or an added hydrogen donor compound. Generally, the tertiary and secondary amines must be soluble in the liquid epoxy resin. When a solid epoxy resin is used, any solid tertiary or secondary amine may be used to make a powdered foamable mixture with delta-1-THPA. Various aliphatic, cyclic-aliphatic, aromatic, and modified polyamines may be used as the tertiary or secondary amine accelerator. Examples of suitable tertiary amines are: benzyldimethylamine (BDMA), triimethylamine, triethylamine, triphenylamine, and methylbenzyldiamethylamine, and triethanolamine. Examples of suitable secondary amines are: diethanolamine, ethyl and methylethanolamine, dimethylamine, diethylamine, methylethylamine, methyl-n-propylamine N,N-diethylamine and piperidine. Pyridines are also suitable as amine accelerators. The above lists are not exhaustive but only exemplary. The amount of the tertiary amine or secondary amine accelerator is not particularly critical, although the amount must be controlled so that cell formation and curing proceed at the proper rates. The amount of amine accelerator used should be in the range of 0.50 to 2.0 PHR.

Additional additives, such as auxiliary blowing agents, surfactants, foam stabilizers, plasticizers, pigments, dyes, fillers, and lubricants may be added to the foamable mixture of epoxy resin, delta-1-THPA and amine accelerator. The auxiliary blowing additives may be toluene, or blowing additives like [pp'oxybis-(benzenesulfonylhydrazine)] or dinitrosopentamethylenetetramine. A surfactant generally serves to decrease the surface tension of the pre-cure composition and thereby promote increased expansion, smaller cells, and more uniform cell size and texture of the expanded formed product. Very suitable for this purpose are materials which are commercially available under the trademarks "Span" and "Tween". These are, respectively, partial esters of the common fatty acids (lauric, palmitic, stearic and oleic) and "Hexitol" anhydrides (hexitans, and hexides) derived from sorbitol, the "Span" surfactant, and materials derived from the "Span" products by adding polyoxyethylene chains to the non-esterified hydroxyls, the Tween surfactant.

When microscopically small hollow spheres are added as filler to the foamable mixture, the type of foamed epoxy product is called a syntactic foam. By the addition of these spheres to the foamable mixture, an added foaming action, which is in addition to the carbon dioxide gas foaming action, occurs when the foamable mixture is heated. When heated, the spheres expand causing expansion of the foamable mixture. The spheres are made of phenolic resin, glass, polystyrene, clay, or urea formaldehyde. The typical amount of spheres added is in the range of 100 to 750 PHR, but the amount depends upon the desired density and configuration of the epoxy foam product.

The epoxy resin, delta-1-THPA and amine accelerator are mixed together in any vessel suitable for stirring a liquid epoxy resin. The epoxy resin is preferably preheated to a temperature around 75° C. to decrease its viscosity and facilitate mixing. Any desired additional additives are also added to the mixture. This mixing produces a foamable mixture which is flowable and which is placed in molds and heated to a curing temperature that starts around 115° C. and is predominant at 120° C. This curing may occur by any known foaming techniques, e.g., open mold or floating platen (restricted rise).

It is believed, but the process of this invention is not limited by this belief, that at the curing temperature some of the delta-1-THPA and tertiary amine accelerator interact to produce carbon dioxide gas. The delta-1-THPA is uniquely stable to the hydroxyl and epoxide groups in the epoxy resin; consequently, the free anhydride is partially converted to the half ester and/or diester in the first stage of the epoxy curing. Then a competing, vigorous reaction of the tertiary amine accelerator with the delta-1-THPA produces a carbon dioxide gas when the foamable mixture is heated to 115° C. The released carbon dioxide gas foams the mixture before gelation occurs. So it appears that some of the delta-1-THPA interacts with the epoxy resin to initiate the curing of the resin while some of the delta-1-THPA undergoes decarboxylation in the presence of a tertiary amine accelerator.

The epoxy foam produced from the above curing may be post cured at a temperature in the range of 150°-200° C. This post-curing would develop the optimum physical and chemical resistant properties of the foam. The post cure time depends on the size or mass of the foam. The foam is annealed to prevent warping in the foam when cooled to room temperature so as not to develop any residual thermal stress.

The type of epoxy foam produced after post curing is a semi-rigid foam. A foam may have various densities of 2 pcf to 20 pcf (pounds per cubic foot) and higher with the delta-1-THPA and appropriate auxiliary blowing agents, surfactants and fillers. The epoxy foam product generally has air filled cells around 50% open cell structures and 50% closed cell structure.

In the preferred embodiment of this invention the delta-1-THPA is mixed with a bisphenol A epoxy resin, ERL 2772, which is equivalent to Epon 826 at 7,000-10,000 cps (centipoise) viscosity and 175-190 epoxide equivalent. The resin and anhydride are mixed at 1.0/0.9 chemical equivalent ratio, or on a weight basis, 76.0 PHR of delta-1-THPA to 100 PHR of epoxy resin. The epoxy resin is heated to 75° C. and the delta-1-THPA crystals are added to the hot resin and stirred into solution. The clear solution is cooled to 40°-45° C. and 1.25 PHR of benzyldemethylamine (BDMA), a tertiary amine accelerator, is added and stirred into the mixture.

The foamable mixture is cast into glass plate molds and preheated to 80° C. The molds are placed into a 120° oven and the solution temperature usually reaches 116° in 20 minutes. The reaction exotherm is so great that the solution foams in the molds and gels inside of several minutes. The foam is post cured for 0.75 hr. at 120° C., plus 1.25 hours at 190° C.

The epoxy foam produced is a semi-rigid foam having a yellow-brown color and contains air filled cells at approximately 50% closed cell structure and 50% open cell structure. The density range of the epoxy foam is 15.0-17.0 pounds per cubic foot. The compressive strength of the semi-rigid foam is 200-300 psi.

In an alternative embodiment of this invention a syntactic epoxy foam is produced. In addition to the foamable mixture, the formulation would contain 100-750 PHR of polystyrene spheres. The mixed delta-1-THPA in the range of 40 to 82 PHR, preferably 59-76 PHR, and ERL-2772 in an amount of 100 PHR and BDMA in the range of 0.50-2.0 PHR and polystyrene spheres in the range of 100-750 PHR is troweled into a 90° C. mold. This mold is closed and heated to 120° C. to produce the syntactic foam. In order to eliminate to some extent the close temperature control needed during the reaction, the polystyrene spheres could be preexpanded by steam or radiant heating and then added to the mold which is preheated to 60° C. The mixed delta-1-THPA, epoxy resin, BDMA foamable mixture is then poured over the preexpanded beads and allowed to cure.

An example of a formulation of the foamable mixture with other typical epoxy foam additives is:

| epoxy resin | ERL-2772 | 100 | PHR |

-continued

| | | | |
|---|---|---|---|
| hardener | delta-1-THPA | 40–82 | PHR |
| amine accelerator | BDMA | 0.5–2.0 | PHR |
| blowing agent | Celogen | 0.1–2.0 | PHR |
| surfactant | Tween 20 | 0.1–0.5 | PHR |

Table I presents five runs which indicate the conditions favorable for producing epoxy foam by the process of this invention. In the last two runs an epoxy foam was not produced because of the low curing temperatures.

Table I

Conditions for Production of Epoxy Foams from Δ' THPA and ERL-2772

| Sample | Resin Anhydride Equivlent | PHR of Anhydride Wt.% | PHR of BDMA Wt.% | Anhydride Acid Wt.% | Gel Temp °C | Curing Hr. | Curing °C | Post Curing Hr. | Post Curing °C | Appearance |
|---|---|---|---|---|---|---|---|---|---|---|
| 1 | 1.0/0.9 | 76 | 1.25 | 0.5 | 120 | 0.75 | 100 | 0.75 | 120 | Numerous |
| | | | | | | 1.75 | 190 | 1.75 | 190 | gas bubbles |
| 2 | 1.0/0.7 | 59 | 1.25 | 0.5 | 120 | 0.75 | 100 | 0.75 | 120 | Numerous |
| | | | | | | 1.75 | 190 | 1.75 | 190 | gas bubbles |
| 3 | 1.0/0.9 | 76 | 2.00 | 0.5 | 120 | 0.75 | 100 | 0.75 | 120 | Numerous |
| | | | | | | 1.75 | 190 | 1.75 | 190 | gas bubbles |
| 4 | 1.0/0.9 | 76 | 1.25 | 5.3 | 85 | 2.0 | 85 | 0.75 | 120 | Clear |
| | | | | | | 0.75 | 120 | 1.75 | 190 | casting |
| | | | | | | 1.75 | 190 | | | No gas bubbles |
| 5 | 1.0/0.9 | 76 | 1.25 | 6.3 | 100 | 0.6 | 100 | 0.75 | 120 | Clear |
| | | | | | | 0.75 | 120 | 1.75 | 190 | casting |
| | | | | | | 1.75 | 190 | | | No gas bubbles |

According to the provisions of the patent statutes, the principle, preferred construction and mode of operation have been explained and what is considered to represent its best embodiment has been illustrated and described. However, it should be understood that within the scope of the appended claims, the invention may be practiced otherwise than as specifically illustrated and described.

We claim:

1. A method for the preparation of a thermoset epoxy foam, consisting essentially of:
   a. mixing in resin-foaming amounts delta-1-tetrahydrophthalic anhydride, an epoxy resin, and an amine accelerator selected from the group consisting of tertiary amines and secondary amines whereby a foamable mixture is made, and
   b. heating said foamable mixture to a temperature of at least 115° C whereby said foamable mixture is foamed and cured.

2. A method according to claim 1 wherein the resin-foaming amounts are based on one hundred parts of epoxy resin and include an amount of delta-1-tetrahydrophthalic anhydride in the range of 40 to 82 PHR (parts per hundred parts of resin), and an amount of said amine accelerator in the range of 0.5 to 2.0 PHR.

3. A method according to claim 1 which includes:
   a. casting said foamable mixture into molds to be subjected to said heating step.

4. A method according to claim 1 which includes:
   a. post curing the thermoset epoxy foam at a temperature in the range of 150°–190° C.

5. A method according to claim 1 wherein a blowing agent and a surfactant are added to said foamable mixture.

6. A method according to claim 1 wherein said epoxy resin is preheated before being mixed with said delta-1-tetrahydrophthalic anhydride and said amine accelerator.

7. A method according to claim 1 wherein said mixing comprises:
   a. heating said epoxy resin,
   b. stirring into the heated epoxy resin delta-1-tetrahydrophthalic anhydride in an amount to give a ratio of delta-1-tetrahydrophthalic anhydride to epoxy resin in the range of 0.5 to 1.0 chemical equivalents,
   c. cooling the stirred, heated epoxy resin and delta-1-tetrahydrophthalic anhydride, and
   d. adding said amine accelerator selected from the group consisting of tertiary amines and secondary amines to the cooled, stirred epoxy resin and delta-1-tetrahydrophthalic anhydride to produce a foamable mixture.

8. A method according to claim 1 wherein said amine is benzyldimethylamine.

9. A method according to claim 1 which includes:
   a. adding to said foamable mixture microscopically small hollow spheres selected from the group consisting of phenolic resin spheres, glass spheres, polystyrene spheres, clay spheres and urea formaldehyde spheres, in an amount in the range of 100 to 750 PHR.

10. A method for the preparation of a thermoset epoxy foam, consisting essentially of:
    a. mixing delta-1-tetrahydrophthalic anhydride in an amount in the range of 40 to 82 PHR, an epoxy resin in an amount of 100 PHR, and an amine accelerator selected from the group consisting of tertiary amines and secondary amines in an amount of 0.5 to 2.0 PHR whereby a foamable mixture is made,
    b. casting said foamable mixture into molds,
    c. heating said foamable mixture in said mold to a temperature of at least 115° C whereby said foamable mixture is foamed and cured, and
    d. post-curing the foamed and cured mixture at a temperature in the range of 150°–190° C.

11. A foamable mixture consisting essentially
    a. an epoxy resin in an amount of 100 PHR,
    b. delta-1-tetrahydrophthalic anhydride in an amount in the range of 40 to 82 PHR,
    c. an amine selected from the group consisting of tertiary amines and secondary amines in an amount in the range of 0.5 to 2.0 PHR.

12. The foamable mixture of claim 11 which includes:
    a. auxiliary blowing agents selected from the group consisting of p,p' oxybis-(benzenesulfonylhydrazide) and dinitrosopentamethylenetetramine, in an amount in the range of 0.1 to 2.0 PHR, a surfactant selected from the group consisting of organopolysiloxanes, polyoxyethylenesorbitanmonolaurate and organic silicon compounds in an amount in the range of 0.1 to 0.5 PHR.

13. A foamable mixture of claim 11 which includes:
a. microscopically small hollow spheres selected from the group consisting of phenolic resin spheres, glass spheres, polystyrene spheres, clay spheres, and urea formaldehyde spheres in an amount in the range of 100 to 750 PHR.

14. An article of manufacture comprising a solid epoxy foam consisting essentially of the interaction product of:
a. an epoxy resin,
b. delta-1-tetrahydrophthalic anhydride, and
c. an amine selected from the group consisting of tertiary amines and secondary amines.

15. An article of manufacture according to claim 14 which includes:
a microscopically small hollow spheres selected from the group consisting of phenolic resin spheres, glass spheres, polystyrene spheres, clay spheres, and urea formaldehyde spheres.

16. A method according to claim 1 wherein a hydrogen-donor compound is mixed with resin-foaming amounts of delta-1-tetrahydrohthalic anhydride, and epoxy resin, and amine accelerator when the amine accelerator is a secondary amine to stimulate the reaction between the secondary amine and the epoxy resin.

17. A method according to claim 16 wherein the hydrogen-donor compound is delta-1-tetrahydrophthalic acid.

* * * * *